Aug. 6, 1940.　　　　J. W. HALE　　　　2,210,239
CHANGE SPEED DEVICE AND CONTROL THEREFOR
Filed Oct. 1, 1937　　　2 Sheets-Sheet 1
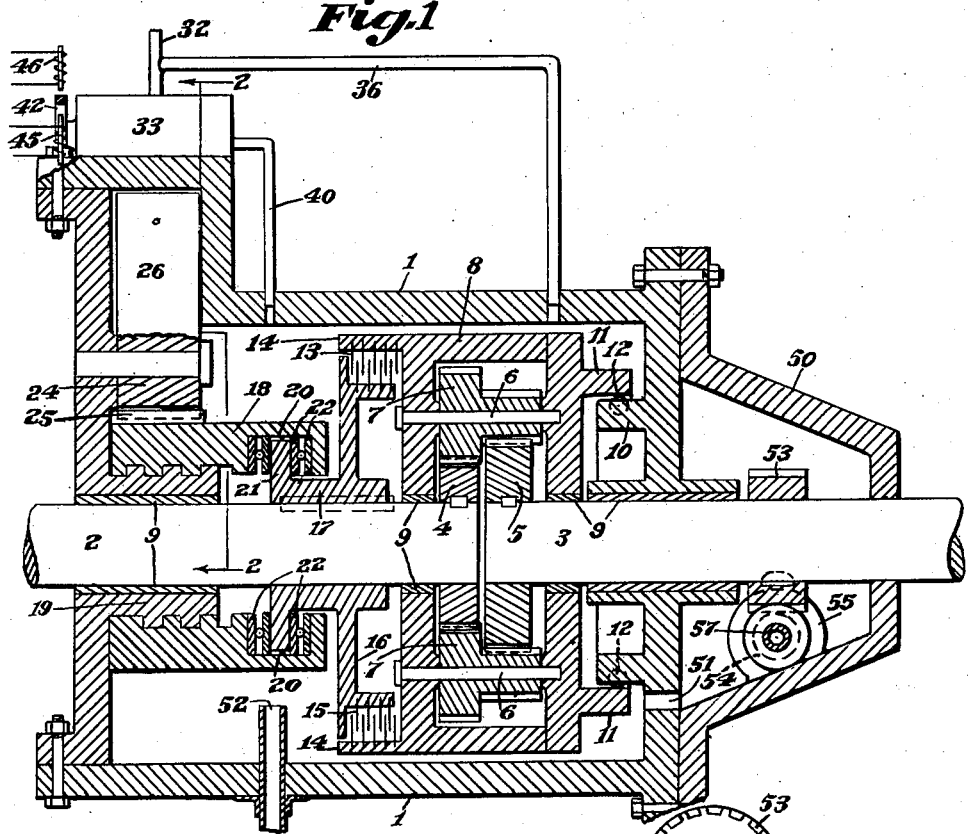
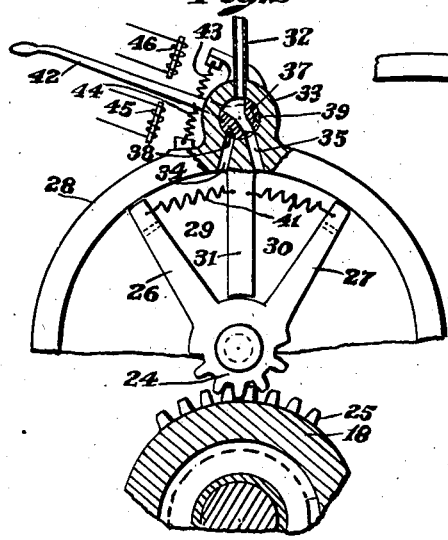
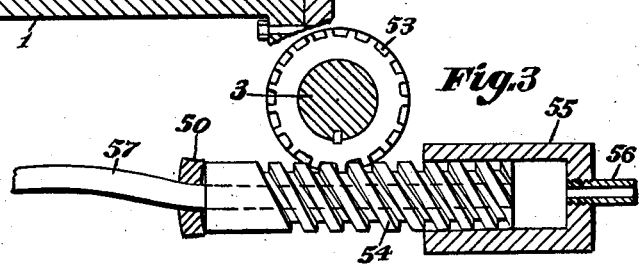
Inventor
Jesse W. Hale
by
Spear, Rawlings & Spear
Attorneys Aug. 6, 1940.     J. W. HALE     2,210,239
CHANGE SPEED DEVICE AND CONTROL THEREFOR
Filed Oct. 1, 1937     2 Sheets-Sheet 2
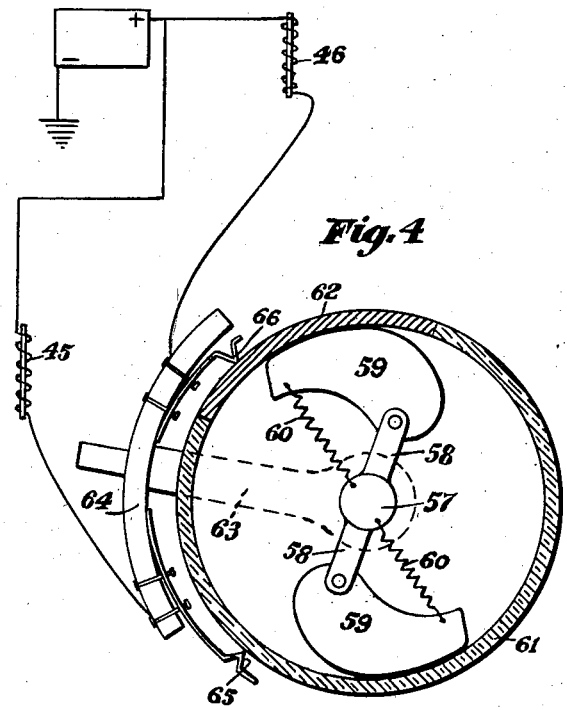
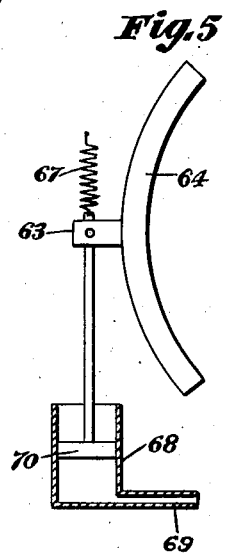
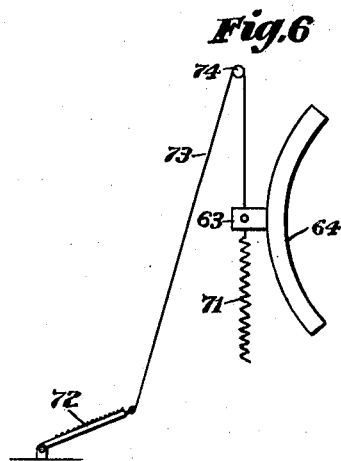
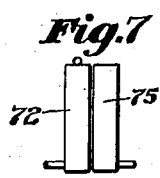
Inventor
Jesse W. Hale
by
Spear, Rawlings & Spear
Attorneys Patented Aug. 6, 1940

2,210,239

UNITED STATES PATENT OFFICE

2,210,239

CHANGE SPEED DEVICE AND CONTROL THEREFOR

Jesse W. Hale, Newton, Mass.

Application October 1, 1937, Serial No. 166,815

21 Claims. (Cl. 74—260)

My present invention relates to improvements in change speed devices and in controls therefor.

In accordance with my present invention, I have provided a novel fluid pressure operated device for effecting the gear ratio changes and a novel electrical control therefor which in the illustrative embodiment is directly operated by the speedometer and either manually or automatically dominated as required by desired operating conditions.

In the operation of change speed devices utilizing the engine lubrication circulatory system, the speed of the vehicle results in an accumulation of oil in the rear of the change speed device with the result that the possibility of leakage is materially increased. In accordance with my present invention, this difficulty can be avoided completely only by the use of means to pump the accumulated oil back to its source.

In the accompanying drawings:

Fig. 1 is a longitudinal section through my device.

Fig. 2 is a fragmentary cross section of Fig. 1 along the lines 2—2.

Fig. 3 is a detailed view of a scavenging pump.

Fig. 4 is a schematic illustration of the electric circuit and the speedometer.

Fig. 5 indicates one type of automatic control.

Fig. 6 illustrates a manual control, and

Fig. 7 is a view showing a convenient pedal arrangement for operating the control suggested in Fig. 6.

At 1, I have illustrated a casing having aligned ports for the drive shaft 2 and the driven shaft 3. The shafts 2 and 3 carry gears 4 and 5 respectively while the shaft 6 for the idler gear 7 in mesh with each of the gears 4 and 5 is supported by a housing 8 mounted on the shafts 2 and 3 for rotation independently thereof. At 9, I have indicated bushings.

The inner surface of the rear wall of the casing 1 is provided with an annular flange 10 and the housing 8 carries a similar flange 11. One way brakes are indicated at 12 to prevent retrograde rotation of the housing 8 to provide a suitable low speed.

To provide a suitable high speed, I have provided clutch means to lock the casing 8 to the drive shaft 2. The clutch means consist of clutch plates 13 carried by the housing flange 14 and clutch plates 15 carried by the flanged disc 16 of the sleeve 17 slidably splined to the drive shaft 2.

In accordance with my invention, the clutch means are moved together or apart as, for example, by rotating the nut member 18 in either direction on the threaded hub member 19. The member 18 is recessed as at 20 to receive the flanged end 21 of the sleeve 17. Bearings 22 are positioned in the recess 20 on each side of the flange 21. While the nut 18 may be rotated by any means, I prefer to utilize the oil pressure available from the lubrication circulating system of the engine and to employ the same system for the lubrication of my change speed device.

At 24 I have shown a toothed member rotatably mounted on the casing 1 and in mesh with the external teeth 25 on the nut member 18. The member 24 includes a pair of radial piston blades 26 and 27 disposed in the sector shaped cylinder 28 divided into the compartments 29 and 30 by the partition 31.

From a source of oil under pressure, such as the crank case of the engine, (not shown), an oil conduit 32 leads to the valve casing 33 from which ports 34 and 35 communicates with the compartments 29 and 30 respectively. An oil conduit 36 extends from the conduit 32 to the casing 1.

Within the casing 33 is a valve member 37 having a fluid passage therethrough formed to connect either the port 34 or the port 35 with the oil conduit 32. The valve member 37 is formed with longitudinal bores 38 and 39 to connect one port to the relief conduit 40 communicating with the casing 1 when the other port is connected to the conduit 32.

A spring 41 connects each of the blades 26 and 27 to the partition 31 to rotate the member 24 to a desired position when the valve member 37 is neutrally positioned and each piston is provided with an aperture to permit the pressure in the compartments 29 and 30 to be relieved when the springs 41 are in control.

The valve member 37 includes a control arm 42 normally under the control of springs 43 and 44 which maintain the arm 42 in a neutral position. The control arm, as indicated in Fig. 2, may be used as a manual control in case of failure of the electric circuits or may be used as the sole control of a change speed device.

A solenoid 46 is adapted to move the arm 42 to position the valve member 37 to direct the flow of fluid under pressure into the compartment 29 to act against the piston blade 26 and turn the member 24 to advance the nut 18 to effect engagement of the clutch means. A solenoid 45 is adapted to move the arm 42 to position the valve member 37 to direct the fluid under pressure into the compartment 30 to disengage the clutch means and as above stated the control arm 42 and the piston blades 26 and 27 are neutrally positioned by the springs 43, 44, and 41 respectively.

Rearwardly of the casing 1 is a casing 50 having a passage 51 in communication with the casing 1 so that accumulations of oil resulting from the movement of the vehicle will result in a flow of oil to the casing 50. Oil return 52 from the casing 1 leads to the source and may, if desired, be connected to the intake of the oil pump of the engine lubricating system. The oil return 52 and the oil passage 51 establish the fluid level in the casing 1.

A gear 53 on the driven shaft 3 meshes with the worm 54 which lies partly in the cylinder 55 from which an oil conduit 56 leads to the crank case, threads on the worm 54 acting as a pump to provide a positive oil system for my device and preventing accumulations of oil in the casings 1 and 50 when the vehicle is moving. The worm 54 rotates the speedometer shaft 57 which, as shown in Fig. 4, carries arms 58 to which are pivoted weights 59 acting against springs 60 to engage the speedometer drum 61 to an extent dependent upon the speed of the vehicle. The drum 61 may be under the control of a spring (not shown) to urge its return to tis original position.

The drum 61 is insulated except in the surface indicated at 62. An adjustable radial arm 63 supports an arcuate arm 64 carrying the low speed contact 65, the circuit to which includes the solenoid 45, and the high speed contact 66, the circuit to which includes the solenoid 46. Only one of the contacts may at one time bear against the contact surface 62 of the drum 61 as the space between them is less than the arc of the contact surface 62.

The arm 63 may be mounted in any suitable way for adjustment relative to the drum and in Fig. 4 I have suggested it be supported by the shaft 57 for movement independent thereof so that the high speed contact 66 may be influenced by the drum 61 at a desired speed of the driven shaft as evidenced by the speedometer. While, of course, the circuits may be closed by an ordinary governor I prefer to utilize the speedometer, as the vehicle speed is more directly represented and an accurate control is thus readily provided. An electric type of spedometer may, of course, be utilized.

While movement of the arm 63 may be entirely a matter of manual selection, in Figs. 5 to 7 I have indicated certain structures more adapted to dominate control over the speedometer control to meet the desired operating conditions than the manual movement of the arm 63.

In Fig. 5 I have shown a spring 67 disposed to move the arm 63 to require higher speeds of the vehicle to close the high speed contact 66. At 68 I have shown a casing having a conduit 69 for connection with the intake manifold of an automobile. In the casing 68 is a piston 70 connected to the arm 63 so that the speed and torque will be fairly represented by the suction, and for example, as the suction decreases the spring 67 will move the arm 63 so that higher vehicle speeds will be required to close the contact 66.

In Figs. 6 and 7 I have shown a control which permits domination of the circuits coincidental to acceleration. A spring 71 controls movements of the arm 63 in one direction while movement of the arm 63 in the other direction results from movement of the pedal 72 from which there is a connection with the arm 63, as, for example, the indicated flexible cable 73 traveling over the pulley 74.

If desired, the pedal 72 may be the accelerator pedal or as shown in Fig. 7 it may be disposed adjacent to an accelerator pedal 75 so that it may be operated coincidentally thereto or the accelerator pedal 75 may be moved without dominating the speedometer control.

In accordance with my invention I am thus able to provide a simple and accurate control for a change speed device which may be adjusted as desired by the operator and dominated as required by operating conditions.

What I therefore claim and desire to secure by Letters Patent is:

1. In a change speed device, a clutch, means to engage and disengage said clutch, a rotatable gear member to operate said means, a sector shaped compartment, said member including radially disposed members in said compartment, valve controlled fluid pressure means to actuate said piston members to rotate said member in one direction, and means to rotate said member in the other direction.

2. In a change speed device, a clutch, means to engage and disengage said clutch, a rotatable gear member to operate said means, a sector shaped compartment, said member including a pair of radially disposed piston members in said compartment, valve controlled fluid pressure means to actuate said piston members, and resilient means to oppose said piston members to actuate said first-named means when said valve means are inoperative.

3. In a change speed device, a clutch, means to engage and disengage said clutch, a rotatable gear member to operate said means, a sector shaped compartment, said member including a pair of radially disposed piston members in said compartment, valve controlled fluid pressure means to actuate said piston members, resilient means to oppose said piston members to actuate said first-named means when said valve means are inoperative, and an aperture to permit fluid displacement by said piston when operated by said resilient means.

4. In a change speed device, a clutch and means to engage and disengage said clutch, a rotatable gear member to operate said means, said member including a pair of radial blades, a casing for said member including a partition disposed to establish with said casing and said blades a pair of compartments, a conduit for fluid under pressure to each of said compartments, and a valve to direct said fluid into either compartment to actuate said member to engage or disengage said clutch.

5. In a change speed device, a clutch and means to engage and disengage said clutch, a pivotable gear member to operate said means, said member including a pair of radial blades, a casing for said member including a partition disposed to establish with said casing and said blades a pair of compartments, a spring to establish a neutral position of said blades, a conduit for fluid under pressure to each of said compartments, and a valve to direct said fluid into either compartment to actuate said member.

6. In a change speed device, a clutch and means to engage and disengage said clutch, a pivotable gear to operate said means, said member including a pair of radial piston blades, a casing for said member including a partition disposed to establish with said casing and said blades a pair of compartments, a conduit for fluid under pressure to each of said compartments, a valve to direct said fluid into either compartment to actuate said member, a valve control means, a pair of solenoids to actuate said valve control means, and an electric circuit to actuate each solenoid.

7. In a change speed device, a clutch and means to engage and disengage said clutch, said means including a hub, a nut threaded thereon, a pivotable gear member in mesh with said nut, said member including a pair of radial piston blades, a casing for said member including a partition disposed to establish with said casing and said blades a pair of compartments, a conduit for fluid under pressure to each of said compartments, a valve to direct said fluid into either compartment to actuate said member, valve control means, a pair of solenoids to actuate said valve control means, an electric circuit to actuate each solenoid, and adjustable speedometer controlled means to close said circuits alternatively at selected speeds.

8. In a change speed device for a drive and driven member, a clutch and means to engage and disengage said clutch, said means including a hub, a nut threaded thereon, a pivotable gear member in mesh with said nut, said member including a pair of radial blades, a casing for said member including a partition disposed to establish with said casing and said blades a pair of compartments, a conduit for fluid under pressure to each of said compartments, a valve to direct said fluid into either compartment to actuate said member, valve control means, a pair of solenoids to actuate said valve control means, an electric circuit to actuate each solenoid, and adjustable speedometer controlled means to close said circuits alternatively at selected speeds, and means operable coincidental to acceleration of said drive member to vary the action of said speedometer controlled means.

9. A control for a change speed device for a drive and driven member comprising a speedometer drum including a contact surface, an adjustable radial arm mounted coaxially with reference to said drum, an arcuate member carried by said arm, a pair of contacts carried by said arcuate member and spaced for alternate engagement with said surface, and a circuit to each contact, each of said circuits including a solenoid adapted to control the operation of said device.

10. A control for a change speed device comprising a speedometer drum including a contact surface, an adjustable radial arm mounted coaxially with reference to said drum, an arcuate member carried by said arm, a pair of contacts carried by said arcuate member and spaced for alternate engagement with said surface, a circuit to each contact, each of said circuits including a solenoid, means coincidentally operable on acceleration of said drive member to move said arm in one direction, and a spring disposed to move said arm in the other direction.

11. A control for a change speed device for use with a prime mover having an intake comprising a speedometer drum including a contact surface, an adjustable radial arm mounted coaxially with reference to said drum, an arcuate member carried by said arm, a pair of contacts carried by said arm and spaced for alternate engagement with said surface, and a circuit to each contact, each of said circuits including a solenoid, a spring disposed to pull said arm in one direction, a cylinder, a piston in said cylinder connected to said arm, and a conduit for said cylinder for connection with said intake whereby said piston will oppose said spring dependent on the intake suction.

12. A control for a change speed device comprising a speedometer drum including a contact surface, an adjustable radial arm mounted coaxially with reference to said drum, an arcuate member carried by said arm, a pair of contacts carried by said arm and spaced for alternate engagement with said surface, and a circuit to each contact, each of said circuits including a solenoid, a spring disposed to pull said arm in one direction, an accelerator pedal, a pedal adjacent thereto and operable coincidentally therewith, and a connection from said second pedal to said arm to move said pedal against the tension of said spring.

13. In a change speed device for a motor vehicle, a clutch, means to operate said clutch, a pair of fluid pressure operated pistons to actuate said means to engage and to disengage said clutch, means to operate said pistons comprising a valve controlled source of fluid under pressure, a circuit including a pair of solenoids to actuate said piston operating means, and means responsive to the driven shaft speed in control of said circuit to close said circuit to said solenoids alternately at desired speeds, means to inoperatively position said piston operating means when said circuits are open, and means to vary the operation of said speed responsive means to effect said circuit as desired by the operator of said motor vehicle.

14. In a change speed device to connect the drive and driven shafts of a motor vehicle, a clutch, means to operate said clutch, a pair of fluid pressure operated pistons to actuate said means to engage and to disengage said clutch, means to operate said pistons comprising a valve controlled source of fluid under pressure, a circuit including a pair of solenoids to actuate said piston operating means, and means responsive to the driven shaft speed in control of said circuit to close said circuit to said solenoids alternately at desired speeds, and means operable coincidental to acceleration of said drive shaft to vary the operation of said speed responsive means to effect said circuit as desired by the operator of said vehicle.

15. In a change speed device to connect the drive and driven shafts of a motor vehicle having a throttle or the like, a clutch, means to operate said clutch, a pair of fluid pressure operated pistons to actuate said means to engage and to disengage said clutch, means to operate said pistons comprising a valve controlled source of fluid under pressure, a circuit including a pair of solenoids to actuate said valve, tension members opposing said solenoids to render said piston operating means inoperative, and means responsive to the driven shaft speed in control of said circuit to close said circuit to said solenoids alternately, at desired speeds, and means to vary the operation of said speed-responsive means to effect said circuit as desired by the operator of said vehicle, said last named means including a control coincidentally operated during acceleration of said drive shaft to vary the closing of said circuits.

16. In a change speed device for a motor vehicle, a clutch, means to engage and disengage said clutch, a source of power to actuate said means, and means to control said power to actuate said first named means to effect successive engagement and disengagement of said clutch at desired driven shaft speeds, said control means comprising a speedometer including a contact surface movable directly with fluctuations in driven shaft speed, and a pair of contacts spaced for alternate engagement by said contact surface and adjustable with reference thereto to permit said contacts to be engaged by said contact surface at desired speeds of said vehicle as indicated by movement of said contact surface.

17. In a change speed device for a motor vehicle, a clutch, means to engage and disengage said clutch, a source of power to actuate said means, and means to control said power to actuate said first named means to effect successive engagement and disengagement of said clutch at desired driven shaft speeds, said control means comprising a speedometer including a contact surface movable directly with fluctuations in driven shaft speed, and a pair of contacts spaced for alternate engagement by said contact surface and adjustable with reference thereto to permit said contacts to be engaged by said contact surface at desired speeds of said vehicle as indicated by movement of said contact surface, and means to vary the position of said contacts with reference to said surface to effect acceleration as caused by operating conditions, said means being operable coincidentally with acceleration and effecting a movement of said contacts with reference to said surface to require contact thereby at different driven shaft speeds.

18. In a change speed device, a casing, a drive shaft, a driven shaft, means within said casing connecting said shafts and means to vary the ratio established by said connecting means, a fluid inlet in said casing, a second casing rearwardly of said first casing, a conduit between said casings disposed to establish a desired fluid level in said first casing and pump means in said second casing to exhaust fluid from said second casing.

19. In a change speed device, a casing, a drive shaft, a driven shaft, means within said casing connecting said shafts and means to vary the ratio established by said connecting means, a fluid inlet in said casing, a fluid outlet in said casing disposed to establish a desired fluid level therein, a second casing rearwardly of said first casing, a conduit between said casings disposed to establish a desired fluid level in said first casing and pump means in said second casing to exhaust fluid from said second casing.

20. In a change speed device, a casing, a drive shaft, a driven shaft, means within said casing connecting said shafts and means to vary the ratio established by said connecting means, a fluid inlet in said casing and means to maintain the fluid in said casing at a desired level, said means including an outlet and pump means in control of said outlet to exhaust fluid, said outlet being disposed to collect oil rearwardly directed by the vehicle speed.

21. In a change speed device, a drive shaft, a driven shaft, means to connect said shafts at different ratios and means to control the operation of said connecting means including means responsive to the speed of said driven shaft, and an accelerator control, a member movable with said accelerator control, said speed responsive means including a freely rotatable drum and means within said drum to rotate said drum, tension means opposing said rotating means, and means carried by said drum coacting with said movable member to render said connecting means subject to the speed of said driven shaft and the position of said accelerator control.

JESSE W. HALE.